Feb. 8, 1949.  H. W. CLIFFORD  2,461,143
GAUGING APPARATUS FOR CHECKING THE
RELATIVE ALIGNMENT OF REFERENCE
PLANES OF SPACED ARTICLES
Filed May 15, 1946  3 Sheets-Sheet 3
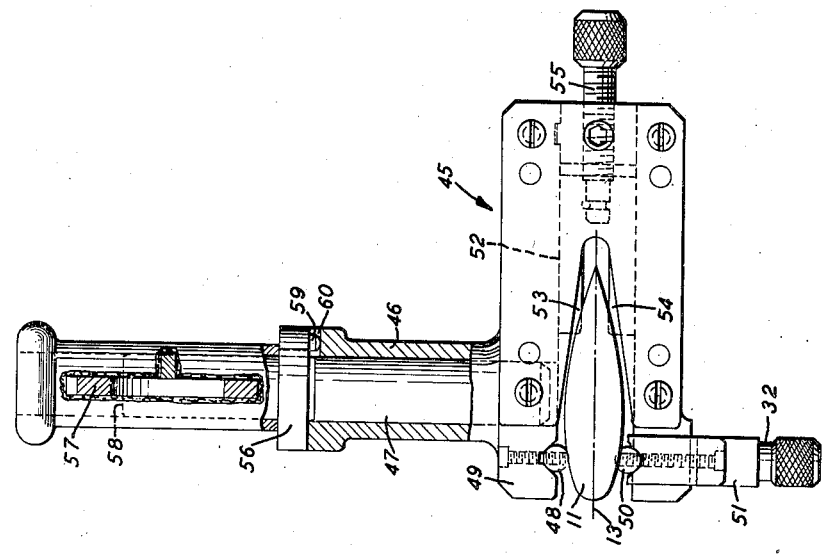
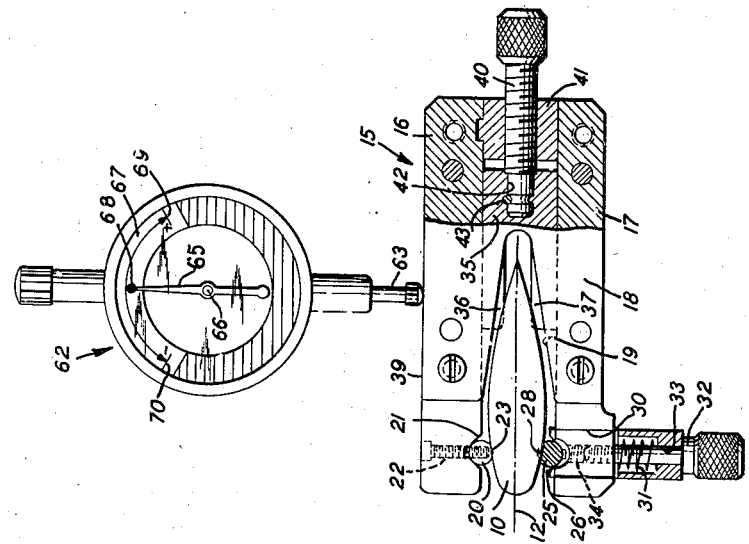
INVENTOR
H.W. CLIFFORD
BY
*W.C. Parnell*
ATTORNEY Patented Feb. 8, 1949

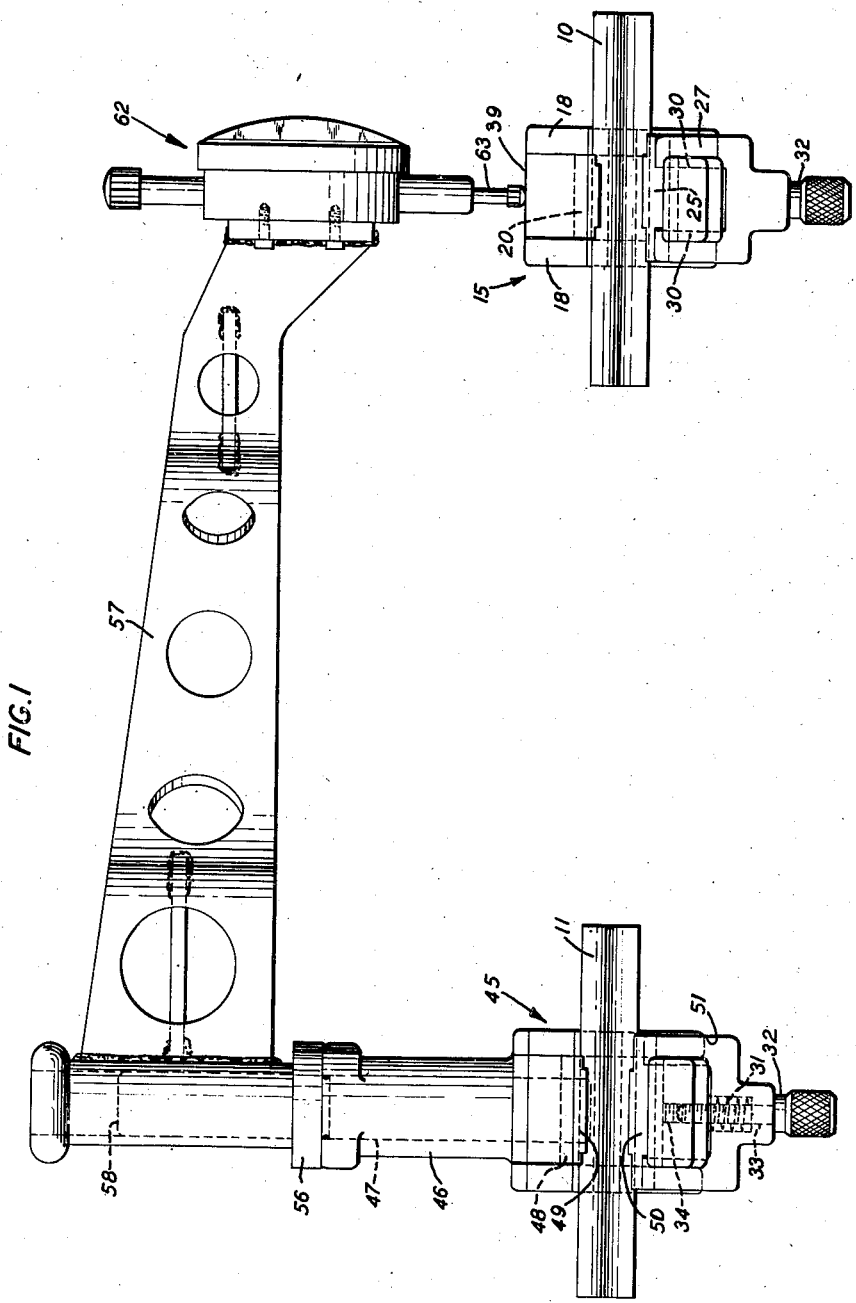

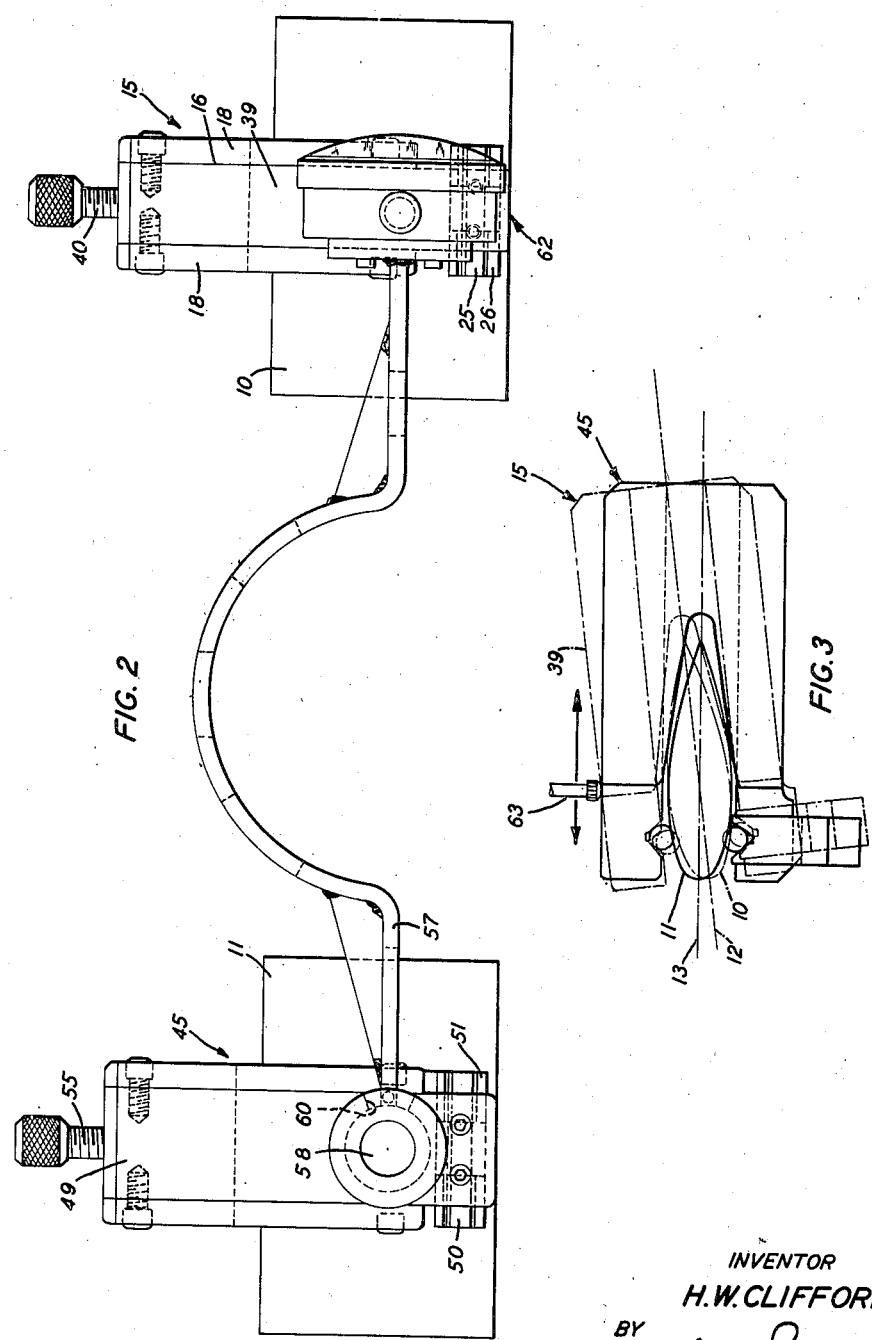

2,461,143

UNITED STATES PATENT OFFICE 2,461,143

GAUGING APPARATUS FOR CHECKING THE RELATIVE ALIGNMENT OF REFERENCE PLANES OF SPACED ARTICLES

Harry W. Clifford, East Orange, N. J., assignor to Western Electric Company, Incorporated, New York, N. Y., a corporation of New York Application May 15, 1946, Serial No. 669,785

6 Claims. (Cl. 33—180)

1

This invention relates to gaging apparatus, particularly for aligning reference planes of spaced articles.

In the manufacture of various kinds of apparatus and equipment it is necessary to check the alignment of related structures to a very high degree of accuracy. When these structures are companion elevators of aircraft or submarine devices or other contoured members, it is often necessary to align the structures with respect to reference planes extending through the members. Common forms of gaging apparatus are not suitable for such purposes since no gaging surface along the reference planes is accessible.

An object of this invention is to provide simple, efficient and accurate apparatus for gaging contoured members for alignment of reference planes extending through the members.

The term "reference plane" describes a theoretical plane extending centrally through each member entering its respective member at like portions at one side thereof and leaving the members at like portions on the opposing side thereof.

Broadly, the apparatus includes a fixed centering unit for attachment to one of the members and having a plane surface parallel with the reference plane of its member, a second centering unit for attachment to the other member supporting a shaft with its axis perpendicular to the reference plane of its respective member, an arm supported by the shaft for movement a given distance about its axis and a unit supported by the free end of the arm and movable over the plane surface of the first centering unit to indicate variations in the said reference planes from aligned positions.

The centering units are substantially identical in structure each having locating elements to engage opposing portions near one side of its respective member, a movable forked member having spaced fingers to engage opposing portions of the member near the other side thereof and cooperating with the locating members in accurately positioning the reference plane of the member parallel with the plane surface in the first centering unit or perpendicular to the shaft in the second centering unit. The indicating unit carried by the arm has a spring-pressed plunger positioned to ride upon the plane surface of the first centering unit to actuate a pointer relative to a dial which has a zero position indicating that the reference planes of the members are in alignment with each other when the pointer registers therewith. Other indicia on the dial indicate not only that the reference planes are out of alignment, but the direction of tilt of one reference plane with respect to another and whether or not the variations in the relative positions of the reference plane are within given limits.

Other objects and advantages will be apparent from the following detailed description when considered in conjunction with the accompanying drawings, wherein Fig. 1 is a side elevational view of the gaging apparatus mounted upon companion members to be gaged;

Fig. 2 is a top plan view of the gaging apparatus;

Fig. 3 is a schematic illustration of the centering units on companion members whose reference planes are out of alignment with each other;

Fig. 4 is a front elevational view of the first centering unit and the indicating unit, portions of the first centering unit being shown in section; and Fig. 5 is a vertical sectional view of the apparatus illustrating the second centering unit with the shaft and supporting arm.

Referring now to the drawings, attention is first directed to the members 10 and 11 whose reference planes 12 and 13 are to be gaged for alignment. The contours of the members 10 and 11 are identical, their cross sectional formations being substantially elliptical with the exception that at like extremities the top and bottom walls continue to an edge.

The first centering unit indicated generally at 15 includes an upper member 16 and a lower member 17 secured in their spaced parallel positions to plates 18 having a V-groove 19 to receive the member 10. A locating element 20 in the form of a rod is held in an inverted V-groove 21 by screws 22 and has a flattened surface 23 to engage and partially conform to the member 10. A similar locating element 25 supported in V-grooves 26 of the legs of a U-shaped member 27 is secured in place in a similar manner to the securing of the element 20, the element 25 also having a flattened surface 28 disposed at an angle to engage a surface of the member 10. The legs of the support 27 are movable in grooves 30 of the member 17 and are normally urged downwardly by a spring 31. A screw 32 extending through an aperture 33 in the member 27, through the spring 31 and into a threaded aperture 34 of the member 17 serves to force the member 27 upwardly into clamping position.

A forked member 35 is positioned to slide longitudinally of and between the members 16 and 17 and is guided thereby in its movement so that the fingers 36 and 37 will engage opposing portions of the member 10 to cooperate with the locating elements 20 and 25 in accurately positioning the reference plane 12 parallel with a plane surface 39 of the member 16. The member 35 is moved relative to the locating elements 20 and 25 by the aid of a screw 40 supported in a threaded aperture of a block 41 mounted between the members 16 and 17 and secured to the plate 39, the inner end of the screw 40 extending into an aperture 42 of the member 35 and held in place by a pin 43.

The second centering unit, indicated generally at 45, is identical in structure with the first centering unit 15, with the exception of a bearing member 46 for a shaft 47 extending perpendicular with respect to the reference plane 13 of the member 11. A locating element 48, identical in structure with the locating element 20 is supported in an inverted V-groove in its member 49 while a companion locating element 50 secured in the V-grooves of the legs of its U-shaped supporting member 51 is movable therewith to cooperate with the locating element 48 in locating its adjacent edge or portion of the member 11. Cooperating with the locating elements 48 and 50 is a forked member 52, the fingers 53 and 54 of which function in accurately locating the centering unit 45 on a member 11, the member 52 being moved by the actuation of a screw 55.

The shaft 47 is removable from its bearing 46 and has an enlarged portion or collar 56 which rests on the upper end of the bearing when positioned therein. An arm 57 is fixedly mounted upon an upper portion 58 of the shaft and is movable about the axis of the shaft a limited distance governed by a pin 59 carried by the collar 56 and projecting downwardly into a notch 60 of the bearing 46, the side walls of the notch serving as stops for the pin.

An indicating unit 62 is mounted upon the free end of the arm 57 and includes a spring-pressed plunger 63 positioned to ride on the plane surface 39 of the first centering unit 15 during rocking movement of the arm 57 within its limits. The plunger 63 is connected in the usual manner to a pointer 65 rotatable about its axis on a shaft 66 relative to a dial 67. In Fig. 4 the pointer is shown registering with a zero indication 68 on the dial, other indications 69 and 70 being provided for the plus (+) and minus (−) limits in the variation of the reference planes 12 and 13 from true aligned positions.

To prepare the apparatus for gaging the members 10 and 11, the centering units 15 and 45 are mounted upon their respective members 10 and 11. Prior to the mounting of the units on their members, the locating elements 25 and 50 are disposed in their lowermost positions and the forked members 35 and 52 are in their rearmost positions so that the centering units may be easily placed on the members. After the units have been firmly mounted on their members the arm 57 with its shaft 47 and the indicating unit 62 may be connected to the second centering unit 45 by lowering the shaft 47 in its bearing 46. At this time the plunger 63 will rest upon the plane surface 39 of the unit 15.

The members 10 and 11 being gaged may have their longitudinal center lines in general alignment with each other on a structure (not shown), however the reference planes 12 and 13 of the members may be out of alignment with each other as illustrated in Fig. 3. This is the condition to be determined by the aid of the gaging apparatus.

Being assured that the axis of rotation of the arm is perpendicular to the reference plane 13, and that the plane surface 39 of the unit 15 is parallel with the reference plane 12, any variation of these reference planes from true alignment with each other would register in the indicating unit 62. The indicating unit 62, when moved by the operator in rocking the arm 57 about the axis of the shaft 47, will be moved in an arc parallel with the reference plane 13. If this arc or path of travel of the indicating unit is not parallel with the plane surface 39 of the unit 15, as indicated in Fig. 3, there will be actuation of the plunger 63 to actuate the pointer 65 relative to the dial 67. The pointer and dial will therefore register the relationship of the reference planes of the members and through this means, the operator may determine whether or not relative adjustments of the members is necessary or whether or not they are within given limits as far as the relationship of the reference planes is concerned. The movement of the indicating unit through the aid of its supporting arm is important, otherwise a false reading may be registered on the indicating unit. For example, the plunger 63 could rest upon a portion of the plane surface 39, as illustrated in Fig. 3 and cause the pointer to register with the zero position, while movement of the indicating unit in either direction from this selected position would cause movement of the plunger to move the pointer first to one side of the zero position and then to the other side thereof. With this arrangement, the operator may accurately determine the relationship of the reference planes of the members.

Although specific improvements of the invention have been shown and described, it will be understood that they are but illustrative and that various modifications may be made therein without departing from the scope and spirit of this invention as defined by the appended claims.

What is claimed is:

1. An apparatus for gaging contoured members for alignment of reference planes extending through their respective members, the apparatus comprising a first centering unit having a plane surface, means for removably securing the first centering unit to one of the members whereby its plane surface will be parallel with the reference plane of its member, a shaft, a second centering unit supporting the shaft, means for removably securing the second centering unit to the other member whereby the shaft will be positioned with its axis perpendicular to the reference plane of its respective member, an arm supported by the shaft for movement about the axis thereof, and a unit supported by the arm movable over the plane surface of the first centering unit to indicate variations in the said reference planes from aligned positions.

2. An apparatus for gaging contoured members for alignment of reference planes extending through their respective members, the apparatus comprising a first centering unit having a plane surface, means for removably securing the first centering unit to one of the members whereby its plane surface will be parallel with the reference plane of its member, a shaft, a second centering unit supporting the shaft, means for removably securing the second centering unit to the other member whereby the shaft will be positioned with its axis perpendicular to the reference plane of its respective member, an arm supported by the shaft for movement about the axis thereof, and a gage unit supported by the arm and having a pointer movable relative to indicia by a plunger positioned to ride on the plane surface of the first centering unit to indicate variations in the said reference planes from aligned positions.

3. An apparatus for gaging contoured members for alignment of reference planes extending through their respective members, the apparatus comprising a first centering unit having a plane surface, means to removably secure the centering unit to one of the members and cause the said plane surface thereof to lie parallel with the reference plane of the member, a shaft, a second centering unit for attachment to the other member supporting the shaft with its axis perpendicular to the reference plane of its respective member, an arm supported by the shaft for movement about the axis thereof, and a unit supported by the arm movable over the plane surface of the first centering unit to indicate variations in the said reference planes from aligned positions.

4. An apparatus for gaging contoured members for alignment of reference planes extending through their respective members, the apparatus comprising a first centering unit having a plane surface, means to removably secure the centering unit to one of the members and cause the said plane surface thereof to lie parallel with the reference plane of the member, a shaft, a second centering unit supporting the shaft, means to removably secure the second centering unit to the other member to position and hold the shaft with its axis perpendicular to the reference plane of the last mentioned member, an arm supported by the shaft for movement about the axis thereof, and a unit supported by the arm movable over the plane surface of the first centering unit to indicate variations in the said reference planes from aligned positions.

5. An apparatus for gaging contoured members for alignment of reference planes extending through their respective members, the apparatus comprising a first centering unit having a plane surface, means for removably securing the first centering unit to one of the members whereby its plane surface will be parallel with the reference plane of its member, a shaft, a second centering unit supporting the shaft, means for removably securing the second centering unit to the other member whereby the shaft will be positioned with its axis perpendicular to the reference plane of its respective member, an arm supported by the shaft for rocking movement about the axis of the shaft, means to limit the rocking movement of the arm in both directions beyond a central position, and a unit supported by the arm movable over the plane surface of the first centering unit to indicate variations in the said reference planes from aligned positions.

6. An apparatus for gaging contoured member for alignment of reference planes extending through their respective members, the apparatus comprising a first centering unit having a plane surface, means to removably secure the centering unit to one of the members and cause the said plane surface thereof to lie parallel with the reference plane of the member, a shaft, a second centering unit supporting the shaft, means to removably secure the second centering unit to the other member to position and hold the shaft with its axis perpendicular to the reference plane of the last mentioned member, an arm supported by the shaft for rocking movement about the axis of the shaft, means to limit the rocking movement of the arm given distances in both directions beyond a central position, and a gage unit, supported by the free end of the arm, including a dial with indicia extending in both directions from a zero position, a pointer cooperating with the dial to register with the zero position if the reference planes are aligned, and a plunger to ride on the said plane surface of the first centering member to actuate the pointer relative to the dial to indicate alignment of the said reference planes or the degrees the said reference planes are out of alignment during rocking movement of the arm.

HARRY W. CLIFFORD.

REFERENCES CITED

The following references are of record in the file of this patent:

UNITED STATES PATENTS

| Number | Name | Date |
| --- | --- | --- |
| 1,351,663 | Koch | Aug. 31, 1920 |
| 1,559,230 | Eccles | Oct. 27, 1925 |
| 2,402,567 | Milner | June 25, 1926 |